(12) United States Patent  (10) Patent No.: US 9,415,627 B2
Skinner et al.  (45) Date of Patent: Aug. 16, 2016

(54) DRAWING APPARATUS

(71) Applicant: Crayola LLC, Easton, PA (US)

(72) Inventors: Craig John Skinner, Nazareth, PA (US); Brian Edward Nemeckay, Belvidere, PA (US); Douglas F. Melville, Jr., Simsbury, CT (US)

(73) Assignee: L&P Property Management Company, South Gate, CA (US)

( * ) Notice: Subject to any disclaimer, the term of this patent is extended or adjusted under 35 U.S.C. 154(b) by 200 days.

(21) Appl. No.: 14/318,827

(22) Filed: Jun. 30, 2014

(65) Prior Publication Data

US 2015/0004568 A1 Jan. 1, 2015

Related U.S. Application Data

(60) Provisional application No. 61/841,761, filed on Jul. 1, 2013.

(51) Int. Cl.
*G09B 11/00* (2006.01)
*B44D 3/00* (2006.01)
*G09B 11/06* (2006.01)

(52) U.S. Cl.
CPC . *B44D 3/00* (2013.01); *G09B 11/06* (2013.01)

(58) Field of Classification Search
USPC .......................... 434/85, 88, 91; 359/447, 635
See application file for complete search history.

(56) References Cited

U.S. PATENT DOCUMENTS

| | | | |
|---|---|---|---|
| 216,460 A | 6/1879 | Rosquist | |
| 561,797 A | 6/1896 | Langworthy | |
| 902,299 A | 10/1908 | Johnson | |
| 1,227,978 A | 5/1917 | Thomson | |
| 1,518,680 A | 12/1924 | Arnot | |
| 2,079,508 A * | 5/1937 | Kaplowitz | G09B 11/06 352/50 |
| 2,369,364 A | 2/1945 | Abrams et al. | |
| 2,387,021 A | 10/1945 | Hendershot | |
| 2,410,447 A * | 11/1946 | Juran | B43L 13/18 33/20.3 |
| 2,418,286 A | 4/1947 | Austin | |
| 2,535,213 A | 12/1950 | Kail | |
| 4,008,528 A * | 2/1977 | Caulfield | G09B 11/10 33/277 |

(Continued)

OTHER PUBLICATIONS

International Search Report with Written Opinion dated Nov. 6, 2014 in Application No. PCT/US2014/045087, 13 pages.

(Continued)

*Primary Examiner* — Kurt Fernstrom

(74) *Attorney, Agent, or Firm* — Shook, Hardy & Bacon, L.L.P.

(57) ABSTRACT

A drawing apparatus for accurately generating a hand-drawn reproduction of an image or object is provided. The drawing apparatus includes a mirror and reflective filter arrangement that allows a user to view, through a single eyepiece, both the object being reproduced and the drawing surface where the user generates a hand-drawn reproduction of the viewed drawing object. In one embodiment, the apparatus includes an adjustable, angled stand for supporting the drawing object, and a drawing surface for generating hand-drawn reproductions. As viewed through the single eyepiece, an image of the drawing surface appears superimposed on the drawing object being reproduced. In further embodiments, the single eyepiece is used with a selectable filter arrangement for adjusting the amount of focus on the drawing surface and/or drawing object.

13 Claims, 14 Drawing Sheets

(56) References Cited

U.S. PATENT DOCUMENTS

| | | | |
|---|---|---|---|
| 4,026,631 A | 5/1977 | Erb | |
| 4,457,717 A * | 7/1984 | Chika | G09B 11/06 248/444.1 |
| 4,571,835 A | 2/1986 | Nishio | |
| 5,100,325 A * | 3/1992 | Cutler | G09B 11/00 434/91 |
| 5,671,091 A | 9/1997 | Monroe et al. | |
| 6,810,591 B2 * | 11/2004 | D'Estais | B43L 13/18 33/1 K |
| 7,513,773 B1 * | 4/2009 | Oakes | G09B 11/00 434/91 |
| 8,864,498 B1 * | 10/2014 | Urso | G09B 11/00 434/91 |
| 2010/0129779 A1 * | 5/2010 | Pomerleau | G09B 11/06 434/88 |

OTHER PUBLICATIONS

International Preliminary Report on Patentability dated Jan. 14, 2016 in Application No. PCT/US2014/045087, 9 pages.

* cited by examiner

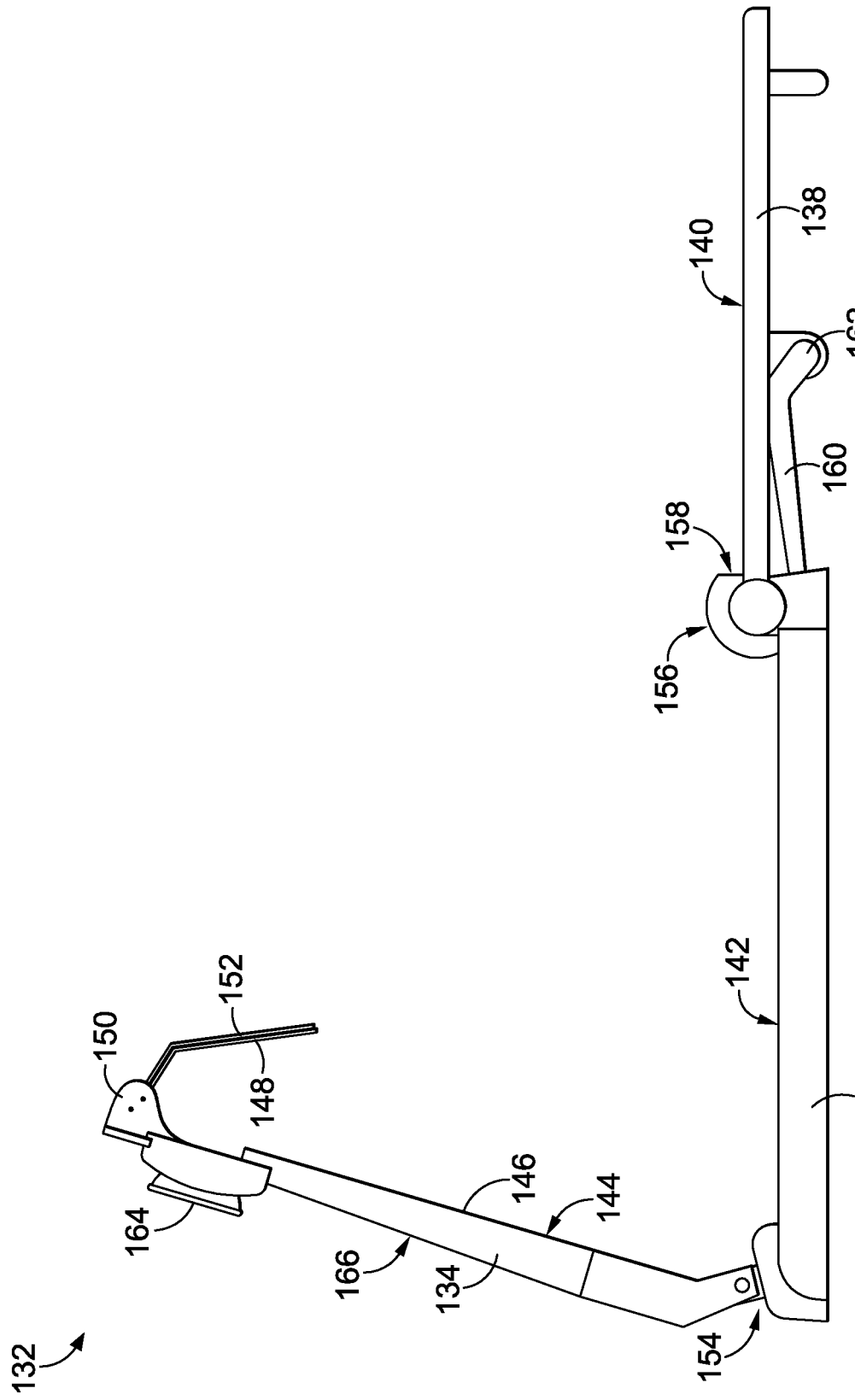

DRAWING APPARATUS

CROSS-REFERENCE TO RELATED APPLICATIONS

This application claims priority to U.S. Provisional Application Ser. No. 61/841,761, filed Jul. 1, 2013, entitled "Drawing Apparatus," the entirety of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a drawing apparatus for accurately generating a hand-drawn reproduction of an image or object. In particular, the invention is directed to a drawing apparatus for reproducing a drawing, photograph, illustration, three-dimensional object, or other drawing object that is positioned by a part of the drawing apparatus. The drawing apparatus includes a minor and reflective filter arrangement that allows a user to simultaneously view, through a single eyepiece, both the object being reproduced and the drawing surface where the user generates a hand-drawn reproduction of the viewed drawing object. In one embodiment, the apparatus includes an adjustable, angled stand for supporting the drawing object, which may be collapsed against and/or towards the drawing surface in a folded configuration. In some embodiments, when viewed through the single eyepiece, an image of the drawing surface appears superimposed on the drawing object being reproduced. In further embodiments, the single eyepiece is used with a selectable filter arrangement for adjusting an amount of focus for viewing the writing surface relative to an amount of focus for viewing the drawing object being reproduced.

DESCRIPTION OF THE DRAWINGS

Illustrative embodiments of the invention are described in detail below with reference to the attached drawing figures, and wherein:

FIG. 13 is a side view of a drawing apparatus in an outward collapsed position, in accordance with an embodiment of the invention;

DETAILED DESCRIPTION

Figure 1:
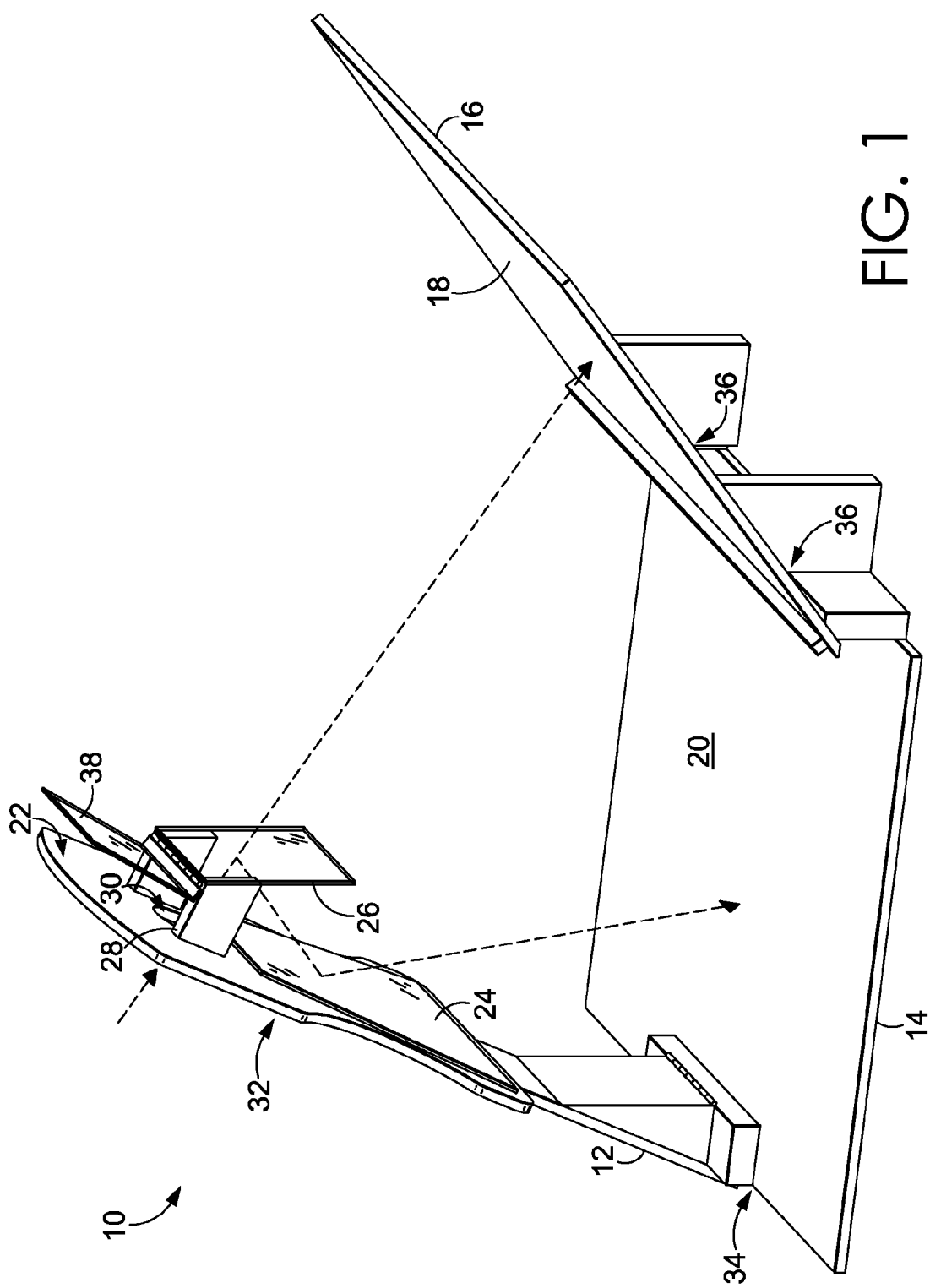
FIG. 1 is a side, perspective view of a drawing apparatus in an expanded position, in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

A drawing apparatus is described herein for accurately generating a hand-drawn reproduction of an image and/or object. In particular, the invention is directed to a drawing apparatus for reproducing a drawing, photograph, illustration, three-dimensional object, or other drawing object that is positioned by a part of the drawing apparatus. The drawing apparatus includes a minor and reflective filter arrangement that allows a user to simultaneously view, through a single eyepiece, both the object being reproduced and the drawing surface where the user generates a hand-drawn reproduction of the viewed drawing object. In one embodiment, the apparatus includes an adjustable, angled stand for supporting the drawing object, which may be collapsed against and/or towards the drawing surface in a folded configuration. In some embodiments, when viewed through the single eyepiece, an image of the drawing surface appears superimposed on the drawing object being reproduced. In further embodiments, the single eyepiece is used with a selectable filter arrangement for adjusting an amount of focus for viewing the writing surface relative to an amount of focus for viewing the drawing object.

Embodiments of the invention are directed to a drawing apparatus. The drawing apparatus includes: a first support having a first surface and an eyepiece, wherein at least a portion of the first surface comprises a mirrored surface; a reflective component coupled to the first support, the reflective component comprising at least one reflective filter and at least one tinted filter; a second support hingedly attached to the first support, the second support comprising at least one drawing surface; and a third support hingedly attached to the second support, the third support configured to support at least one drawing object, wherein the at least one drawing surface and the at least one drawing object are simultaneously viewed through the eyepiece via the reflective component.

In another embodiment, a drawing apparatus for reproducing a drawing object on a drawing surface is described. The drawing apparatus includes: a first support comprising an eyepiece, a minor on a first surface of the first support, and a reflective component, wherein the reflective component comprises a reflective filter and a tinted filter; a second support coupled to the first support, the second support comprising at least one drawing surface; and a third support coupled to the second support, the third support configured to support at least one drawing object, wherein the at least one drawing object and the at least one drawing surface are simultaneously viewed through the eyepiece from a second surface of the first support.

In a further embodiment, a drawing apparatus comprises: a first support comprising an eyepiece, a minor, and a reflective component, wherein the reflective component comprises a reflective filter and a tinted filter, wherein the tinted filter is selectively positionable with respect to the eyepiece; a second support coupled to the first support, the second support comprising a drawing surface; a third support coupled to the second support, the third support configured to secure at least one drawing object, wherein the drawing surface and the drawing object are simultaneously visible to a user through the eyepiece, wherein the drawing object is directly viewed via the eyepiece and the reflective filter, and further wherein the drawing surface is indirectly viewed via the eyepiece and the minor.

With reference now to the figures, a drawing apparatus is described in accordance with embodiments of the invention. Various embodiments are described with respect to the figures in which like elements are depicted with like reference numerals.

Figure 2:
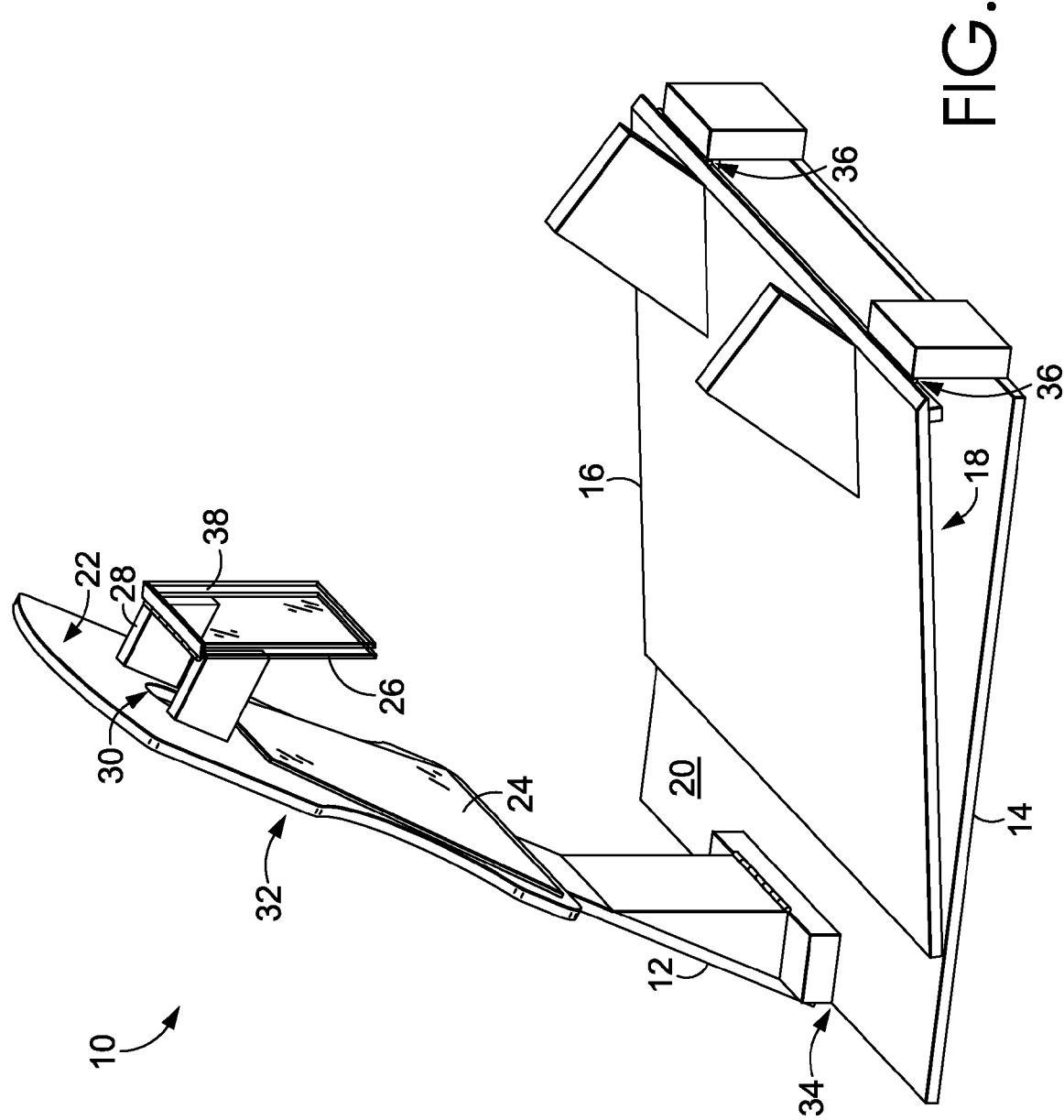
FIG. 2 is a side, perspective view of the drawing apparatus of FIG. 1 in a partially collapsed position, in accordance with an embodiment of the invention.
Figure 3:
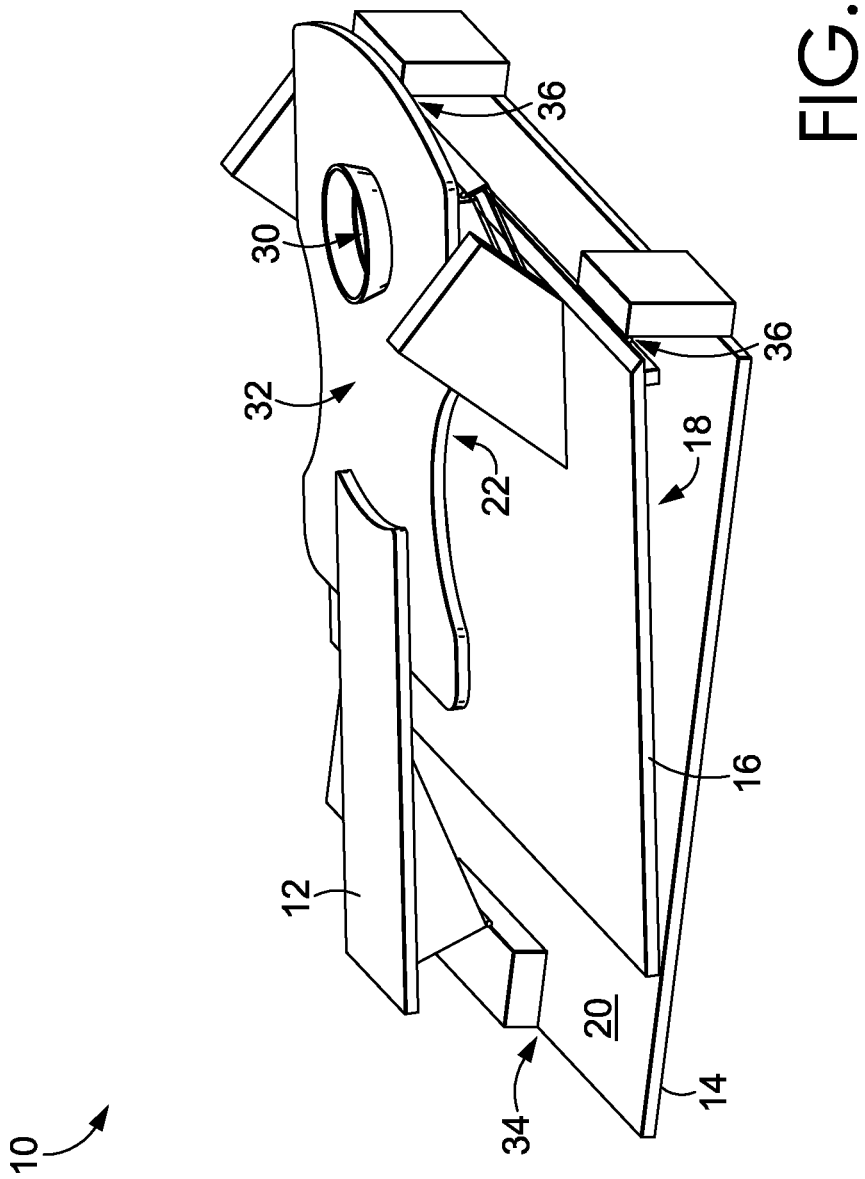
FIG. 3 is a side, perspective view of the drawing apparatus of FIG. 1, in a fully collapsed position, in accordance with an embodiment of the invention.

As depicted in FIGS. 1-5, one embodiment of the invention includes a drawing apparatus 10 having a first support 12, a second support 14, and a third support 16. The third support 16 includes a copy surface 18 of the third support 16 that supports a drawing object for reproduction by the drawing apparatus 10. The second support 14 includes a drawing surface 20 that supports a drawn image of a drawing object reproduced using the drawing apparatus 10. In embodiments, third support 16 pivots with respect to second support 14 at a second pivot point 36, as shown in FIG. 2, while first support 12 pivots with respect to second support 14 at first pivot point 34, as shown in FIG. 3. In one embodiment, the third support 16 may be pivoted about second pivot point 36 for positioning a number of different types of two-dimensional and/or three-dimensional objects for use with the drawing apparatus 10. As such, although depicted at a particular angle in FIG. 1, it should be understood that the third support 16 may be pivoted about second pivot point 36 to support various two-dimensional and three-dimensional objects on copy surface 18.

Additionally, the first support 12 includes a first surface 22 of the first support 12, with a mirrored surface 24 on the first surface 22 that faces the copy surface 18. First support 12 also includes an eyepiece 30 that is viewed by a user from a second surface 32 of the first support 12. Further, the first support 12 includes a reflective component 28 having a reflective filter 26 and a tinted filter 38. As shown in greater detail in FIGS. 4-5, the upper portion 40 of first support 12 includes a lens 42 of the eyepiece 30 that allows a user to view portions of the reflective component 28 through the eyepiece 30.

In embodiments of the invention, the drawing apparatus 10 includes an eyepiece 30 and reflective component 28 that are configured to provide simultaneous viewing of both the drawing surface 20 and the copy surface 18. As such, in embodiments, the reflective filter 26 is a transparent, reflective filter mechanism that allows a user to directly view the copy surface 18 through the eyepiece 30, as demonstrated by the dashed line of sight in FIG. 1. Further, the drawing surface 20 is viewed through the eyepiece 30 based on reflection of the drawing surface 20 by mirrored surface 24, and subsequent projection of the reflected image onto reflective filter 26, as demonstrated by the dashed line of sight in FIG. 1. In other words, the reflective filter 26 enables a user of the drawing apparatus 10 to reproduce a hand-drawn version of what is displayed and/or supported on the copy surface 18. In doing so, the reflective filter 26 captures a reflected image of the drawing surface 20 on the semi-transparent surface of the reflective filter 26 such that a user simultaneously views the user's hand-drawn markings on drawing surface 20 as "overlaid" on the drawing object of copy surface 18.

Figure 5:
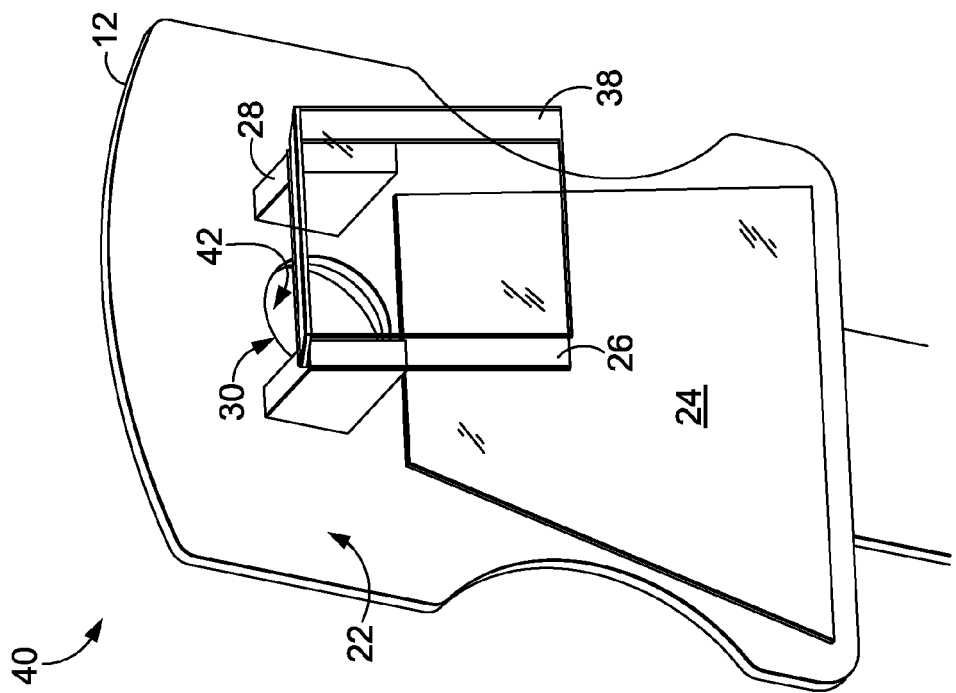
FIG. 5 is a back, perspective view of an enlarged portion of the drawing apparatus of FIG. 1, in accordance with an embodiment of the invention.
Figure 4:
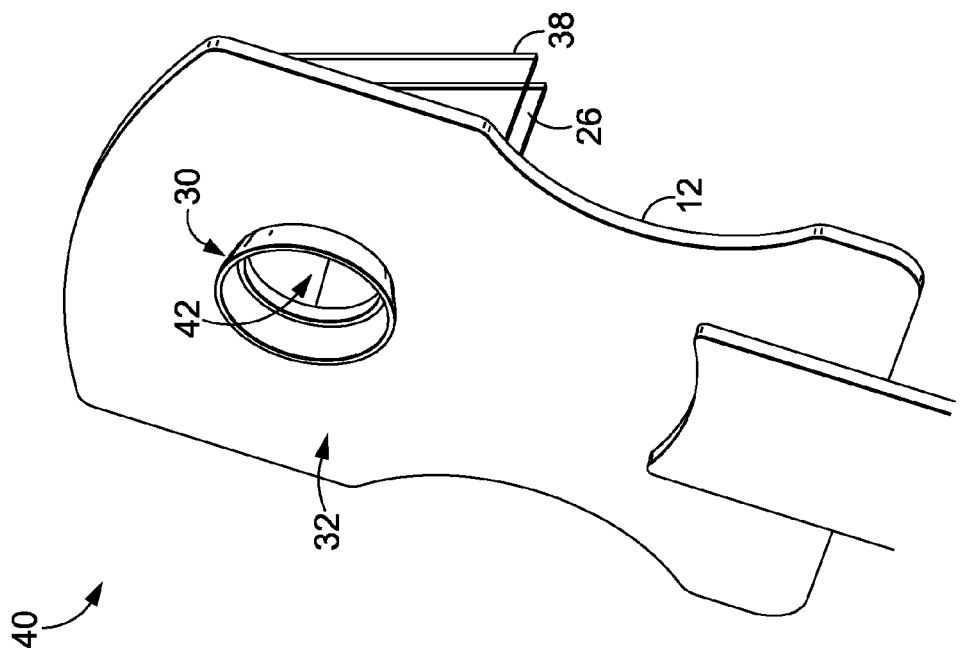
FIG. 4 is a front, perspective view of an enlarged portion of the drawing apparatus of FIG. 1, in accordance with an embodiment of the invention.

As shown in FIG. 5, the tinted filter 38 is "flipped down" into a first position, parallel to the reflective filter 26 such that a user views both the reflective filter 26 and the tinted filter 38 through the eyepiece 30 (when viewed from the second surface 32 of first support 12). In one embodiment, tinted filter 38 provides an additional amount of focus for the hand-drawn image created on drawing surface 20 relative to the object being drawn. In one embodiment, the amount of focus on drawing surface 20 is enhanced by blocking at least a portion of the light gathered from the drawing object displayed on copy surface 18, thereby allowing the light reflected from the drawing surface 20 to be stronger. In other words, tinted filter 38 makes a hand-drawn image appear darker than the drawing object. Conversely, removal of the tinted filter 38 by "flipping" it into a "second position" removes the tinted filter 38 from view through the eyepiece 30 and instead allows the user to view the drawing object in greater focus than the drawing surface 20.

Figure 6:
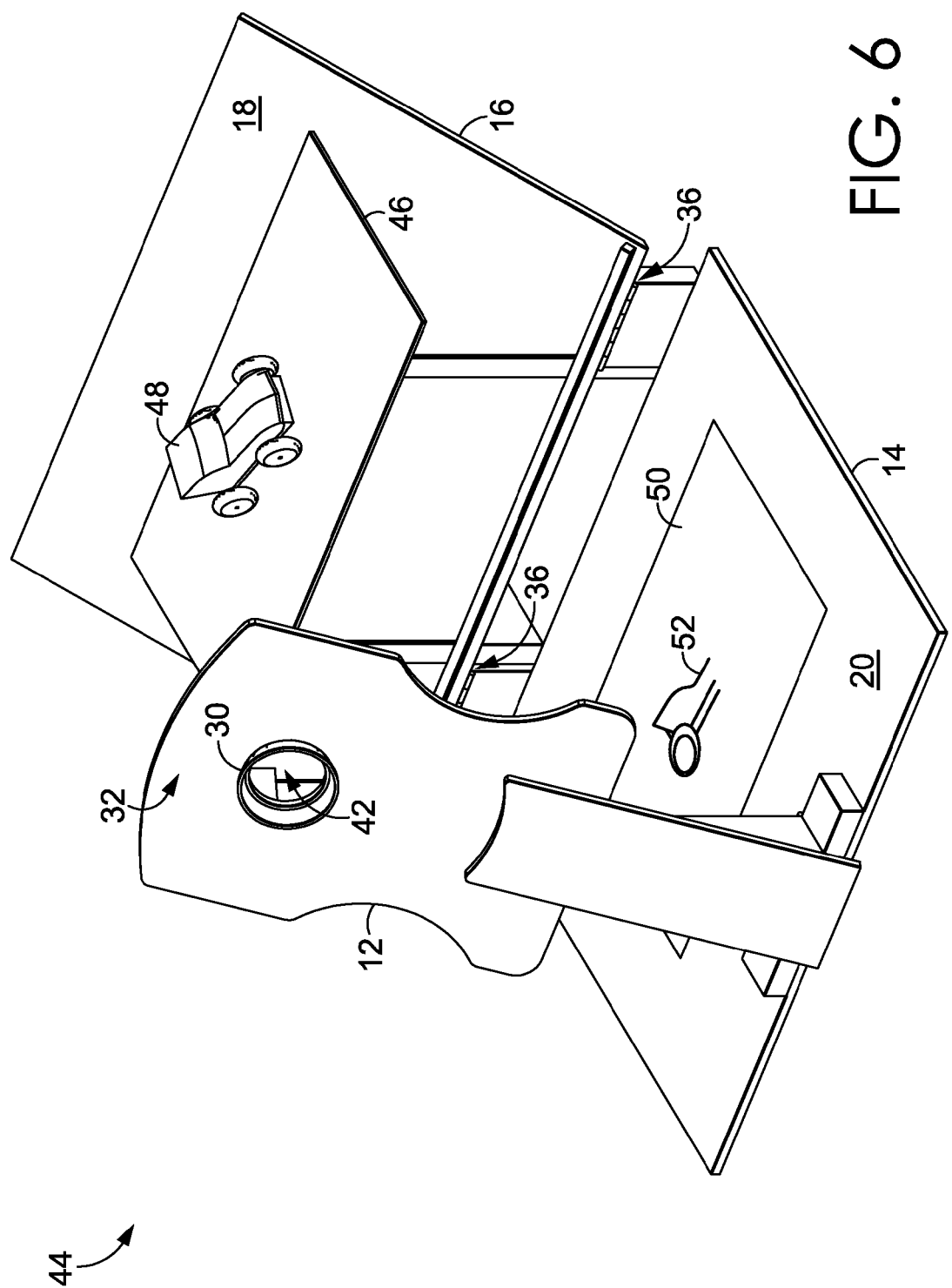
FIG. 6 is a front, perspective view of a drawing apparatus in an expanded position, in accordance with an embodiment of the invention.
Figure 7:
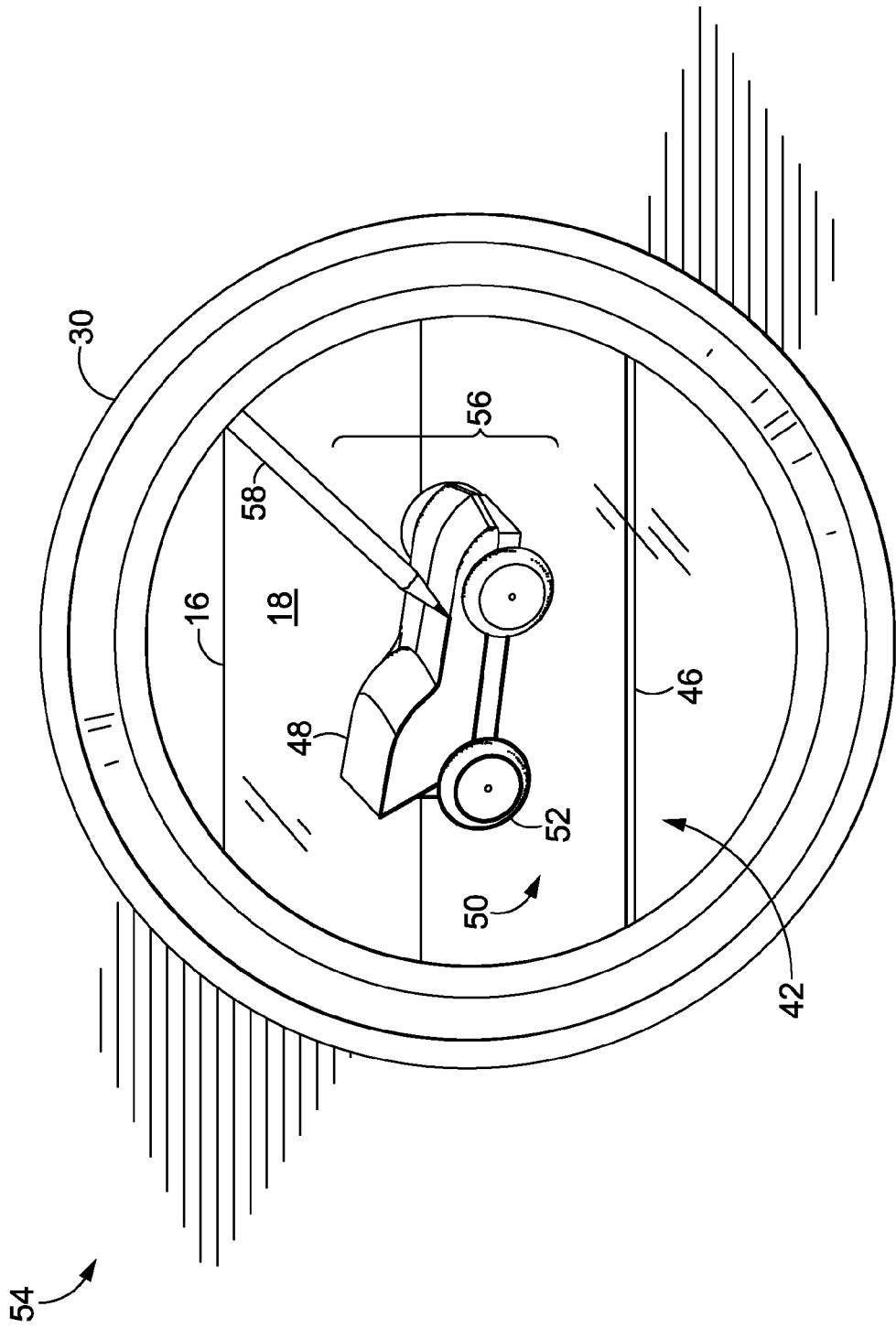
FIG. 7 is an enlarged, front view of the drawing object and drawn image simultaneously viewed through an eyepiece of a drawing apparatus, in accordance with an embodiment of the invention.

With reference now to FIGS. 6-7, embodiments of the invention include a drawing apparatus 44 having a fold-out adjustable platform 46 for positioning three-dimensional drawing objects 48 for viewing through the eyepiece 30. The drawing object 48 may be reproduced on the drawing surface 20 using any number of different types of drawing devices 50, such as a piece of paper, plastic, fabric, etc. As shown in FIG. 6, the drawn image 52 reproduced on drawing surface 20 is a "traced" image of the drawing object 48 that is created by a user based on what is visible through the eyepiece 30. As will be understood, any number of devices for positioning drawing object 48 may be coupled to third support 16. Accordingly, the fold-out adjustable platform 46 is depicted in FIG. 6 as one exemplary support device coupled to the drawing apparatus 44.

In the enlarged view of FIG. 7, eyepiece view 54 depicts what may be viewed by a user through eyepiece 30, when using drawing apparatus 44. As shown in FIG. 7, eyepiece view 54 includes an eyepiece 30 having a lens 42, which enables a user to view both the drawing object 48 (on adjustable platform 46 of copy surface 18, on third support 16) and the drawn image 52 (on drawing device 50 of drawing surface 20). In other words, as a user traces on the drawing device 50 with writing utensil 58, the combined view 56 is presented to the user via eyepiece 30.

Figure 8:
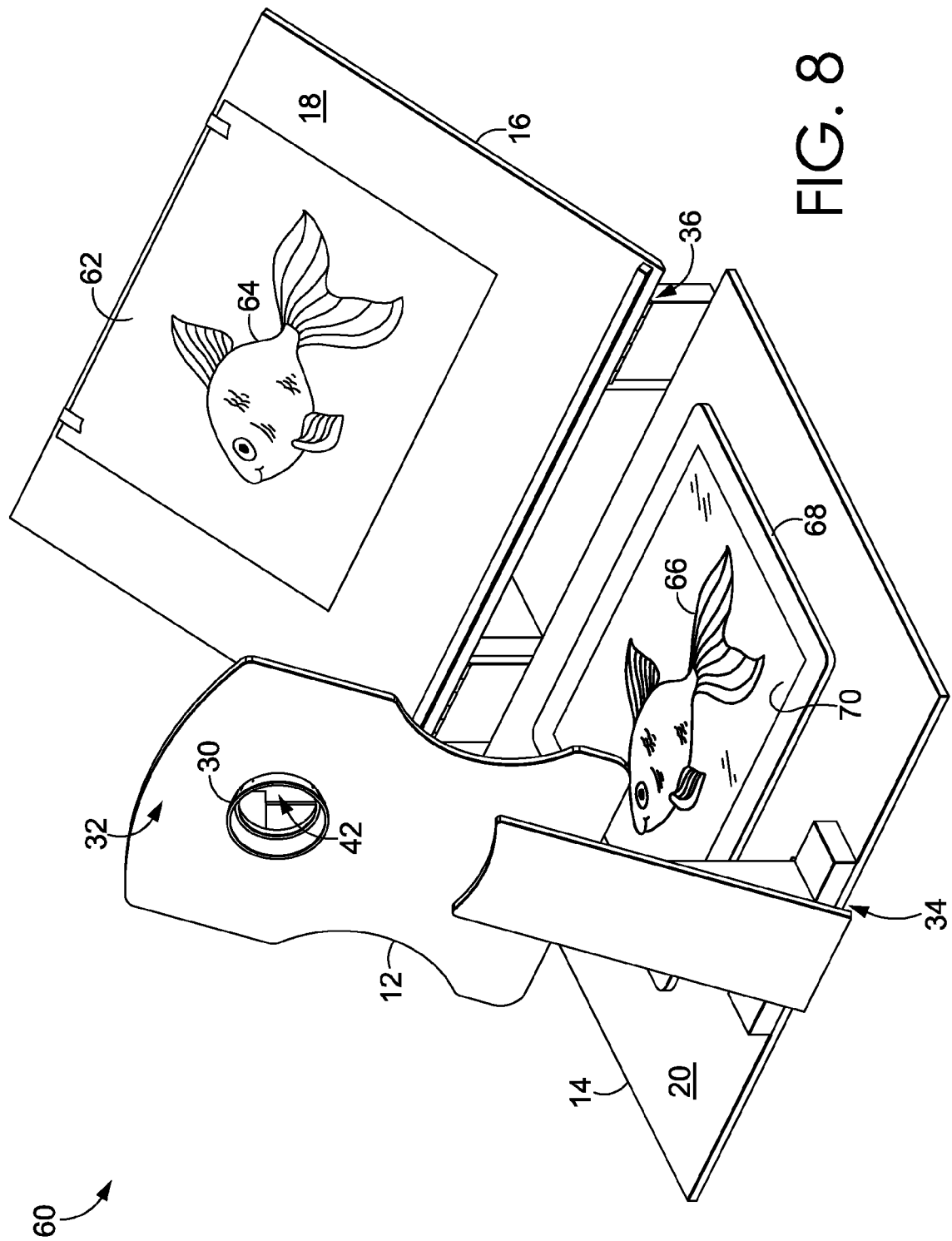
FIG. 8 is a front, perspective view of a drawing apparatus in an expanded position, configured to reproduce a drawing object from a paper drawing surface onto a touchscreen device (e.g., a tablet), in accordance with an embodiment of the invention.
Figure 9:
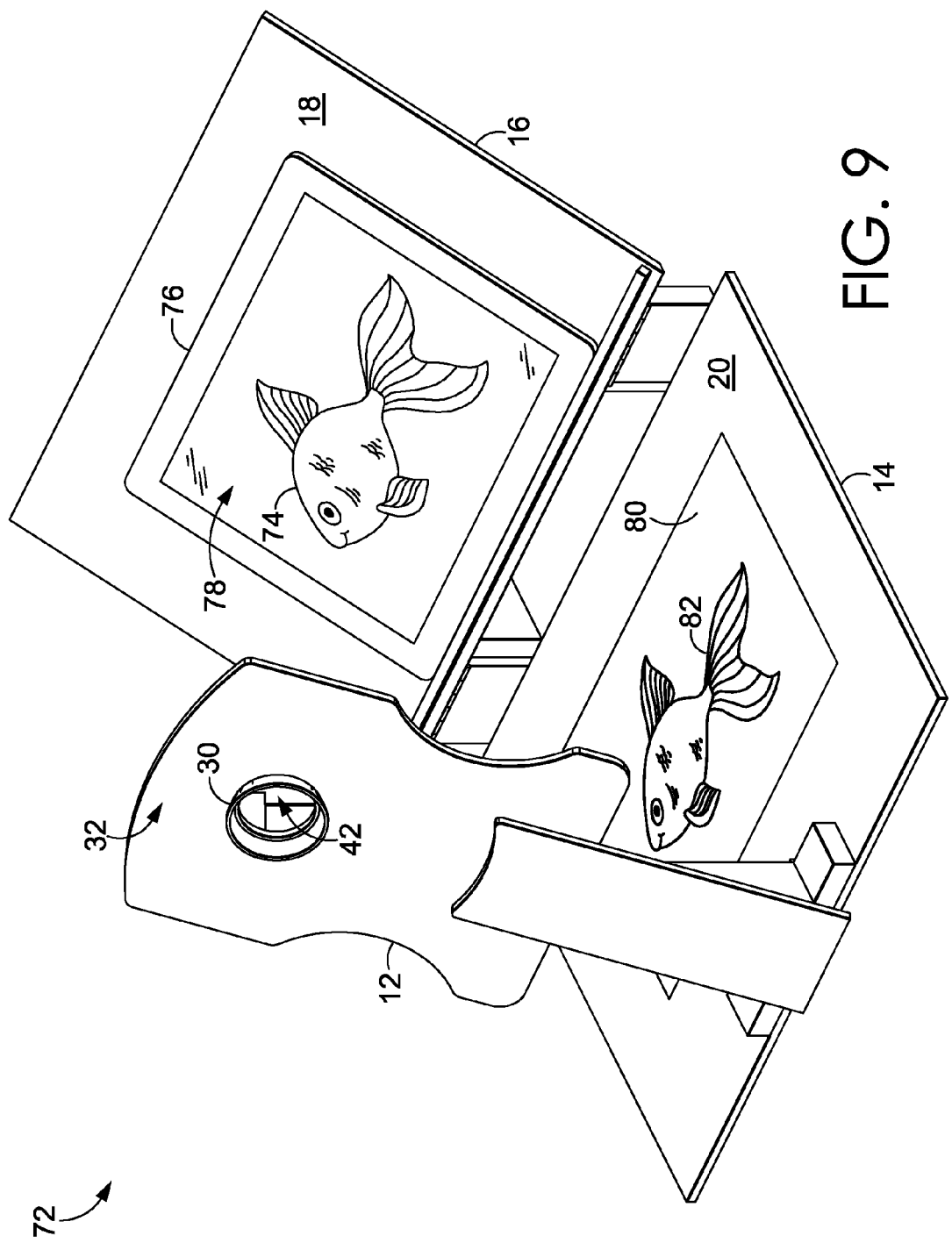
FIG. 9 is a front, perspective view of a drawing apparatus in an expanded position, configured to reproduce a drawing object from a touch screen device (e.g., a tablet) onto a paper drawing surface, in accordance with an embodiment of the invention.

Turning now to FIGS. 8-9, another embodiment of drawing apparatus 60 includes a display surface 62 with a drawing object 64. As shown in FIG. 8, copy surface 18 may be used to support a two-dimensional image for reproduction using the drawing apparatus 60, such as a drawing on a piece of paper. While viewing the display surface 62 through the eyepiece 30, the user may then reproduce the drawing object 64 to create a drawn image 66 on the touchscreen surface 70 of a touchscreen device 68. In other words, the drawing surface 20 may support any type of surface and/or material for reproducing a drawing object, such as a drawing device 50 (e.g., a piece of paper, a plastic writing sheet, a dry-erase sheet, a piece of fabric, and/or other material for printing a hand-drawn image) and/or a touchscreen device 68. Similarly, as shown in FIG. 9, the touchscreen device 76, having a drawing object 74 displayed on the touchscreen surface 78, may be supported on the copy surface 18 of third support 16. As such, a drawing device 80 (e.g., a piece of paper) supported on drawing surface 20 is used create a drawn image 82 of the displayed drawing object 74. As seen in the examples of FIGS. 8-9, a touchscreen device may be used to both provide a drawing object for reproduction by a user and serve as a writing surface for a user to create a hand-drawn reproduction of an object being displayed.

Figure 10A:
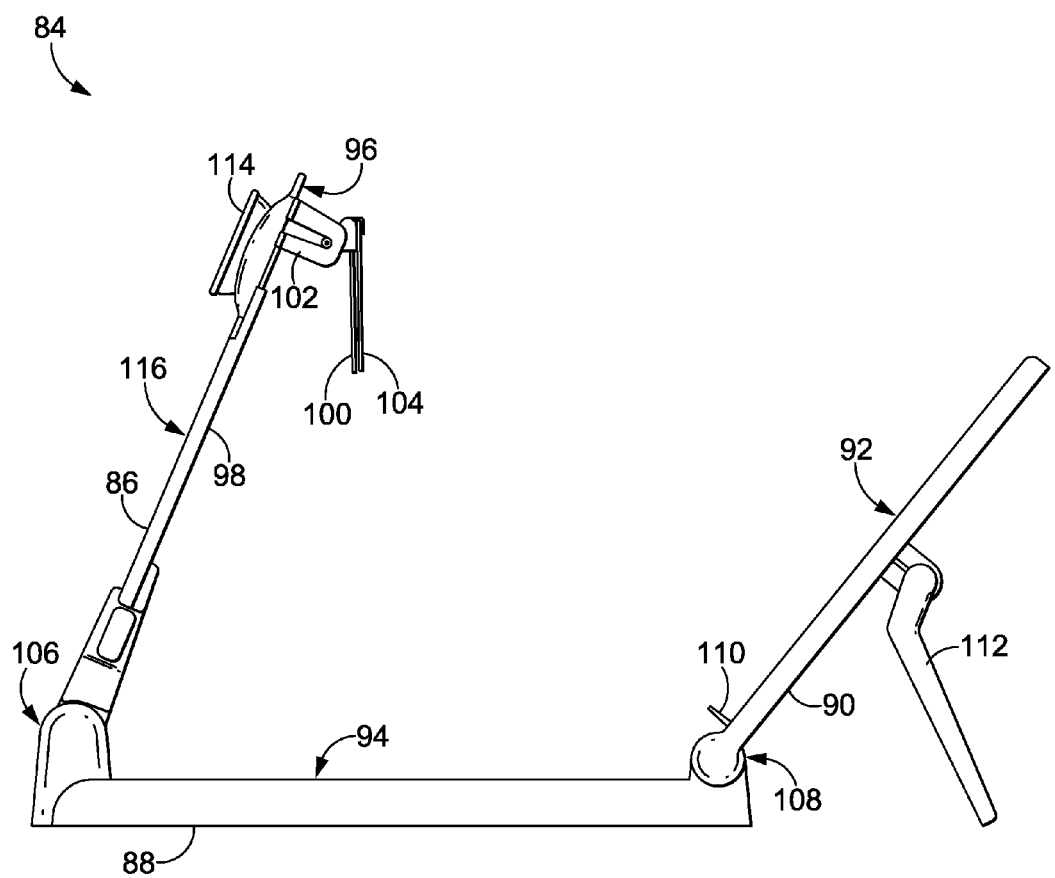
FIG. 10A is a side view of a drawing apparatus in an expanded position, with a tinted filter in a first position relative to the reflective component, in accordance with an embodiment of the invention.
Figure 10B:
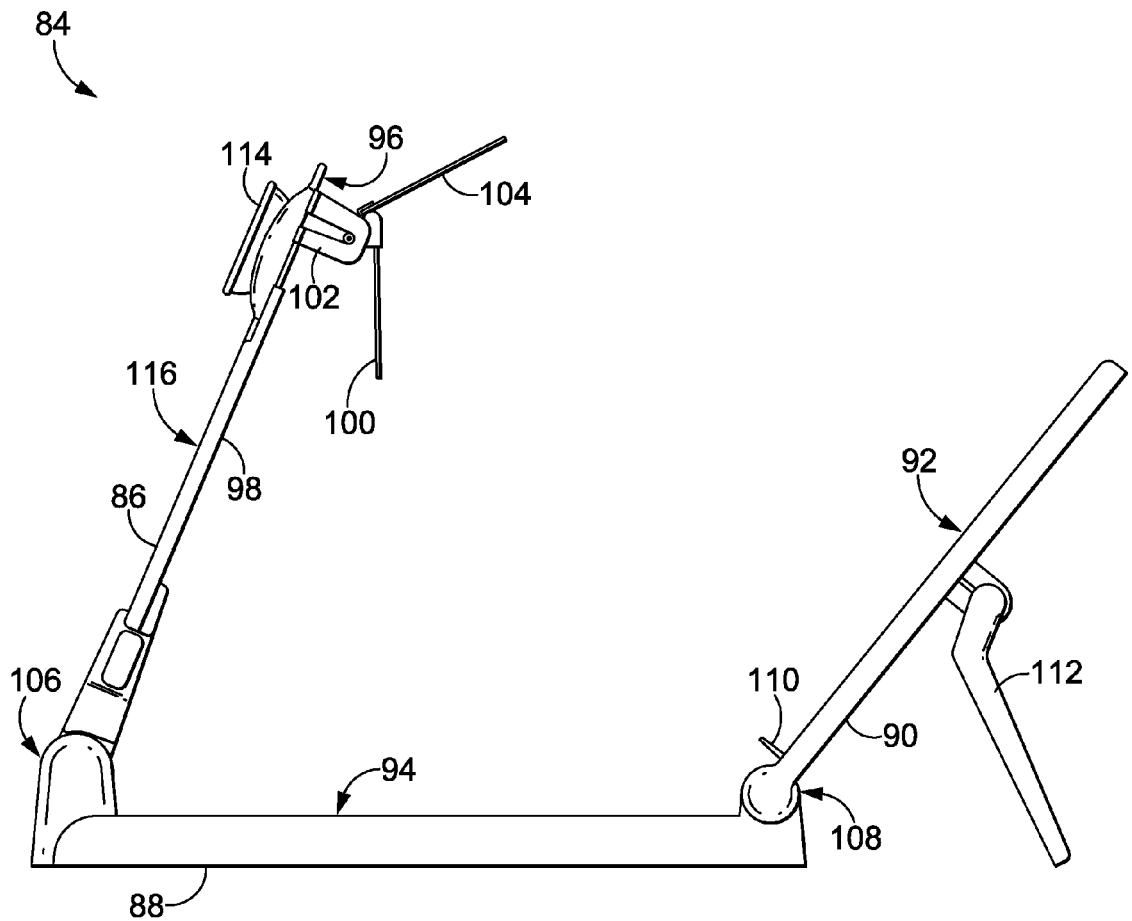
FIG. 10B is a side view of the drawing apparatus of FIG. 10A, with a tinted filter in a second position relative to the reflective component, in accordance with an embodiment of the invention.
Figure 11:
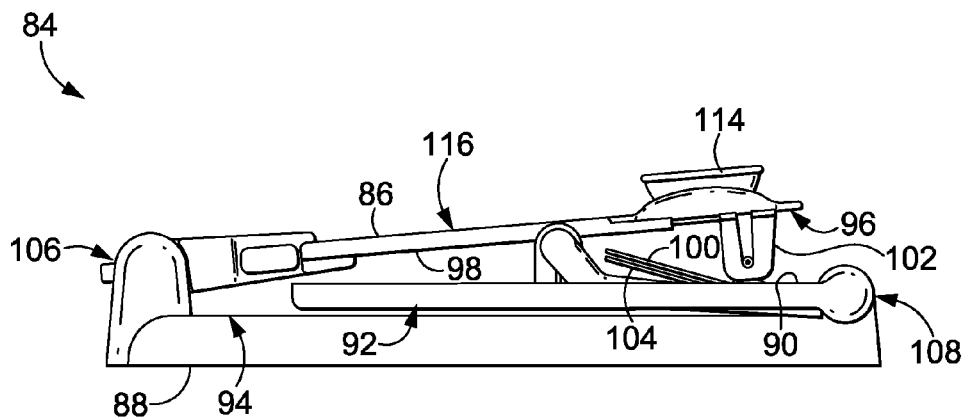
FIG. 11 is a side view of the drawing apparatus of FIG. 10A in a collapsed position, in accordance with an embodiment of the invention.

With reference now to FIGS. 10A-11, an embodiment of a drawing apparatus 84 includes a first support 86, a second support 88, and a third support 90. The third support 90 includes a copy surface 92 for supporting drawing objects to be reproduced by a user, while the second support 88 includes a drawing surface 94 for creating drawn images from the displayed/supported drawing objects. First support 86, when viewed from the back side 96, includes a mirrored surface 98 that reflects an image of what is being drawn on drawing surface 94 onto reflective filter 100. Reflective filter 100 is part of reflective component 102, which in some embodiments, also includes a tinted filter 104 for adding an additional amount of focus to a drawn image produced on drawing surface 94, as viewed through the eyepiece 114. Additionally, tinted filter 104 may be viewed through the eyepiece 114 in a first position (FIG. 10A) and is not viewed through the eyepiece 114 when in a second position (FIG. 10B). As such, the tinted filter 104 is selectively positionable with respect to the eyepiece 114.

Additionally, drawing apparatus 84 may be configured to expand or collapse into one of multiple positions for use and/or carrying of the drawing apparatus 84. For example, the drawing apparatus 84 is shown in an open position (FIG. 10A) and a closed position (FIG. 11) by virtue of folding the drawing apparatus 84 at first pivot point 106 and/or second pivot point 108. Further, in collapsing the drawing apparatus 84, one or more of the filters of the reflective component 102 may be positioned for closer contact of the first support in the collapsed position.

In one embodiment, the drawing apparatus 84 includes a support tray 110 for supporting a drawing object on the copy surface 92 of third support 90, as best depicted in FIGS. 10A-10B. For example, support tray 110 may be used to position a two-dimensional drawing object (i.e., a piece of paper and/or a touchscreen device) on the third support 90 for viewing through the eyepiece 114. In a further embodiment, the position of third support 90 is secured using positioner 112. Positioner 112 may be used to secure third support 90 when adjusted via rotation about second pivot point 108, and may also be collapsed against third support 90 during storage of the drawing apparatus 84.

Figure 12A:
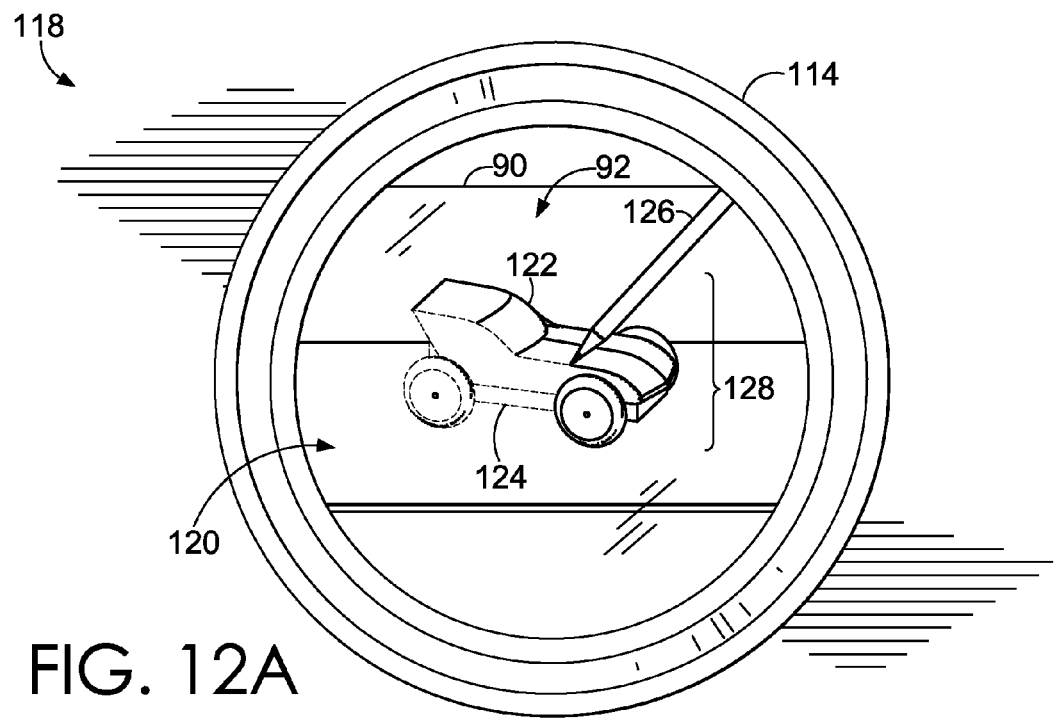
FIG. 12A is an enlarged, front view of the drawing object and drawn image simultaneously viewed through an eyepiece of a drawing apparatus, with a tinted filter in a second position such that the drawing object is in greater focus than the drawing surface, in accordance with an embodiment of the invention.
Figure 12B:
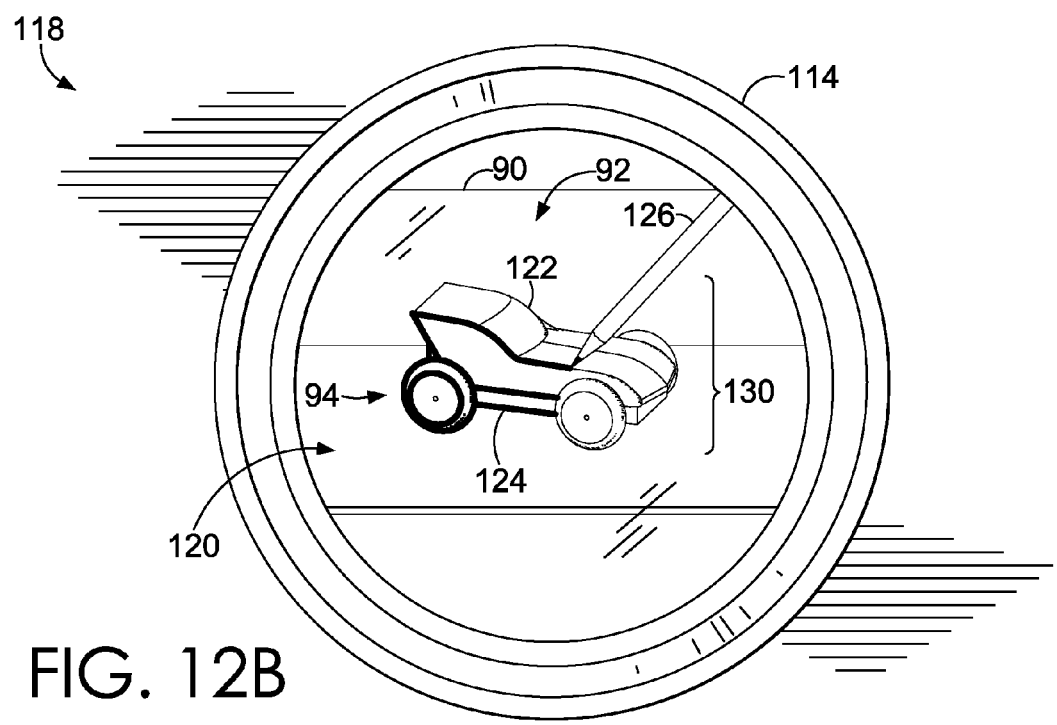
FIG. 12B is an enlarged, front view of the drawing object and drawn image simultaneously viewed through an eyepiece of a drawing apparatus, with a tinted filter in a first position such that the drawing surface is in greater focus than the drawing object, in accordance with an embodiment of the invention.

With reference to FIGS. 12A-12B, an exemplary enlarged eyepiece view 118 through the eyepiece 114 of drawing apparatus 84 demonstrates a tinted filter removed (FIG. 12A) and a tinted filter positioned for viewing (FIG. 12B). In other words, in FIG. 12A, the tinted filter 104 of reflective component 102 is removed from view through the lens 120 of eyepiece 114 such that, when the drawing object 122 and drawn image 124 are simultaneously viewed from the front side 116 of drawing apparatus 84, the drawing object 122 appears more focused than the drawn image 124. In other words, the combined view 128 in FIG. 12A depicts a hand-drawn reproduction (drawn image 124) being created by writing utensil 126, with the greater amount of focus being on the drawing object 122 in combined view 128. This is in contrast to the view of FIG. 12B, where the tinted filter 104 of reflective component 102 is positioned in conjunction with the reflective filter 100 such that both the tinted filter 104 and the reflective filter 100 are viewed through the lens 120 of the eyepiece 114.

Accordingly, the tinted filter 104 and reflective filter 100 provide a combined view 130 where the drawing image 124 is in greater focus than the drawing object 122 when the drawing image 124 and drawing object 122 are simultaneously viewed through the lens 120 of eyepiece 114. In one embodiment, the tinted filter 104 blocks an amount of light from the drawing object 122, thereby allowing the light reflected from drawing surface 94 and/or drawn image 124 to be stronger than the light reflected from drawing object 122 and/or copy surface 92. As will be understood, whether drawing object 122 is a two-dimensional object or a three-dimensional object, the tinted filter 104 may block an amount of light from the copy surface 92 such that drawn image 124 appears darker than drawing object 122.

Referring finally to FIGS. 13-15B, an embodiment of a drawing apparatus 132 includes a first support 134, a second support 136, and a third support 138. In embodiments, the third support 138 includes a copy surface 140 for supporting drawing objects to be reproduced by a user, while the second support 136 includes a drawing surface 142 for creating drawn images from the displayed/supported drawing objects. First support 134, when viewed from the back side 144, includes a mirrored surface 146 that reflects an image of what is being drawn on drawing surface 142 onto reflective filter 148, according to one embodiment of the invention. Reflective filter 148 is part of reflective component 150, which in some embodiments, also includes a tilted and/or additional filter 152 for adding an additional amount of focus to a drawn image produced on drawing surface 142, as viewed through the eyepiece 164. Additionally, additional filter 152 may be viewed through the eyepiece 164 in a first position (FIGS. 13 and 14B), while it is not viewed through the eyepiece 164 when in a second position (FIG. 14A). As such, the additional filter 152 is selectively positionable with respect to the eyepiece 164. In further embodiments, the additional filter 152 is selectively positionable with respect to the reflective filter 148, according to embodiments of the invention.

Additionally, drawing apparatus 132 may be configured to expand or collapse into one of multiple positions for use and/or carrying of the drawing apparatus 132. For example, the drawing apparatus 132 is shown in an open and/or expanded position (FIGS. 14A-14B) and an outward collapsed position (FIG. 13) by virtue of folding the drawing apparatus 132 at a second pivot point 156 towards or away from the first support 134 and/or the second support 136. Further, in extending third support 138 into an outward collapsed position, the drawing apparatus 134 may be configured to reproduce images of one or more larger items resting on the copy surface 140 (e.g., a basket of fruit resting on copy surface 140). In one embodiment of the invention, the drawing apparatus 132 is configured into an outward collapsed position, as shown in FIG. 13, based on collapsing the folding leg 160 into contact with the third support 138, and pivoting the folding leg 160 about pivot point 162 such that it is in contact with and/or substantially parallel to the third support 138.

Figure 14A:
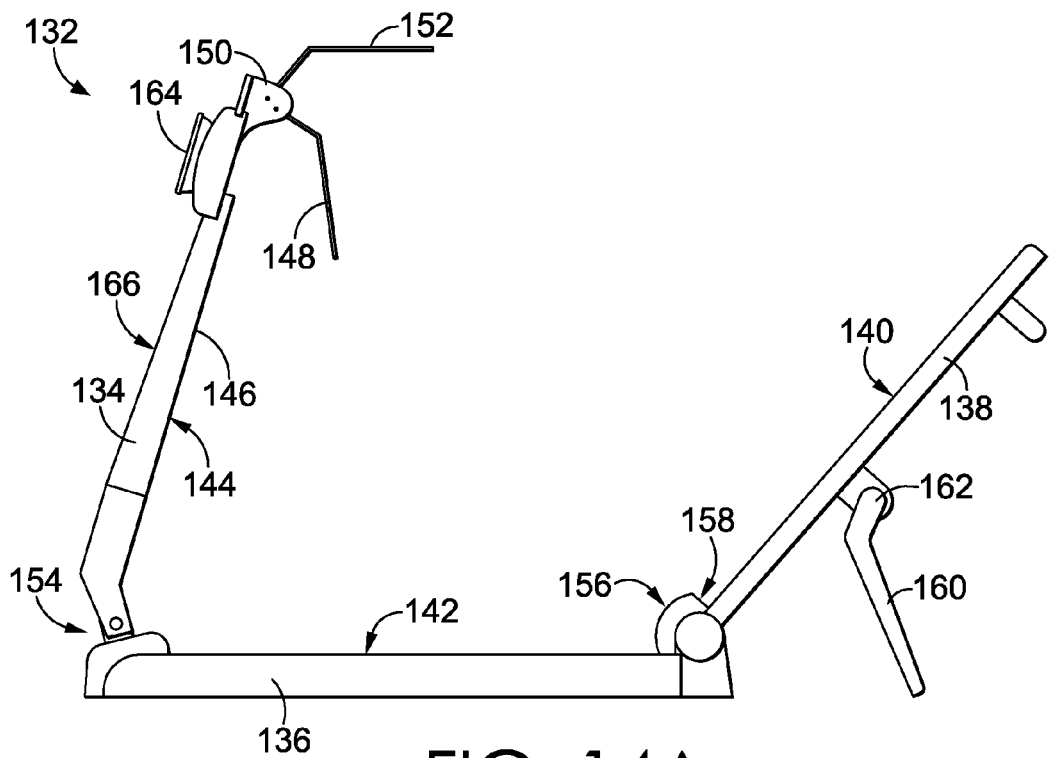
FIG. 14A is a side view of the drawing apparatus of FIG. 13 in an expanded position with an additional filter in a second position relative to a reflective component, in accordance with an embodiment of the invention.
Figure 14B:
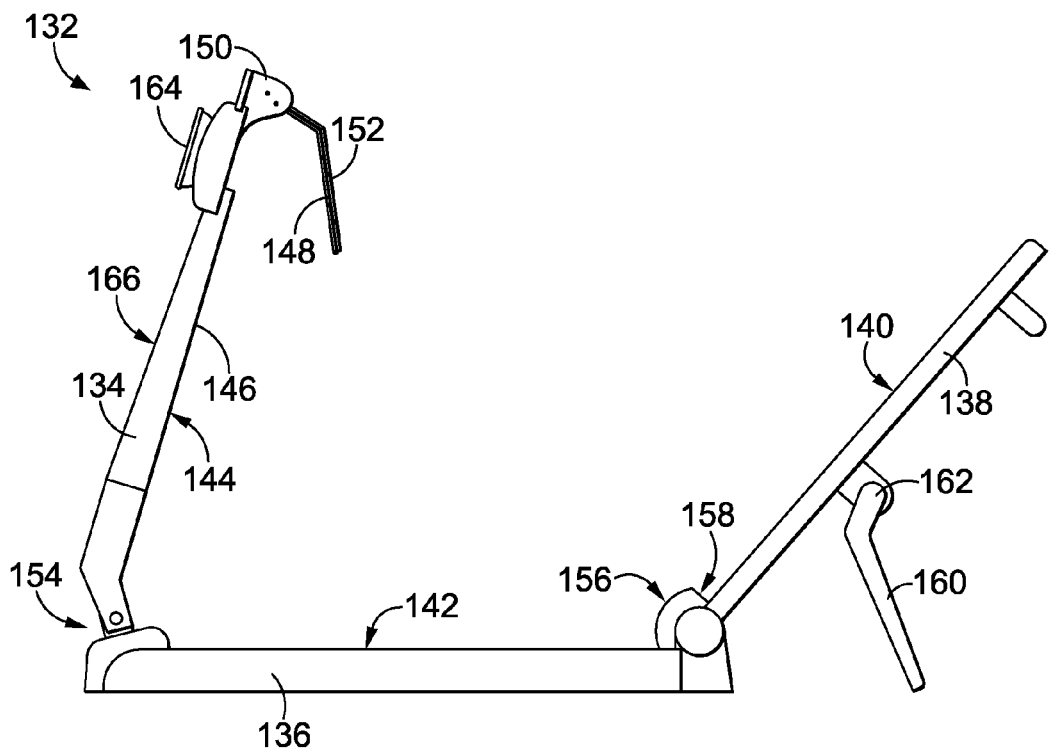
FIG. 14B is a side view of the drawing apparatus of FIG. 13 in an expanded position with an additional filter in a first position relative to a reflective component, in accordance with an embodiment of the invention.

In embodiments, folding leg 160 may be configured to support the drawing apparatus 132 in an expanded position for reproducing drawing objects supported at an angle with respect to the copy surface 140, such as a piece of paper resting against ledge 158 and/or copy surface 140 on third stand 138. In some embodiments, the angle of viewing of the eyepiece 164 and/or position of the first support 134 may be adjusted to correlate viewing of a three-dimensional object resting on the horizontal copy surface 140, in an outward collapsed position. As shown in FIGS. 14A-14B, with third support 138 in an expanded position supported by folding leg 160 rotated out about pivot point 162, a drawing object resting on copy surface 140 and/or against ledge 158 of the third support 138 may enable a user to reproduce one or more images onto a drawing surface 142. As discussed in the examples above, drawings surface 142 may be configured to secure many different types of drawing surfaces, devices, screens, receivers, and/or other mechanisms for receiving an input from a user. In one embodiment, the second support 142 serves as a capacitive sensing surface for detecting a drawing, by a user, of a reproduced image of a drawing object reflected from third support 138.

As further depicted in the embodiment of FIGS. 14A-14B, the additional filter 152 may be manipulated into one of multiple positions with respect to the reflective filter 148, having one of multiple effects on a viewed image of a drawing object on third support, and a corresponding impact on the user's perceived and/or reproduced image on the second support 136 (i.e., by virtue of the user drawing on and/or marking on a surface in association with the drawing surface 142).

Figure 15A:
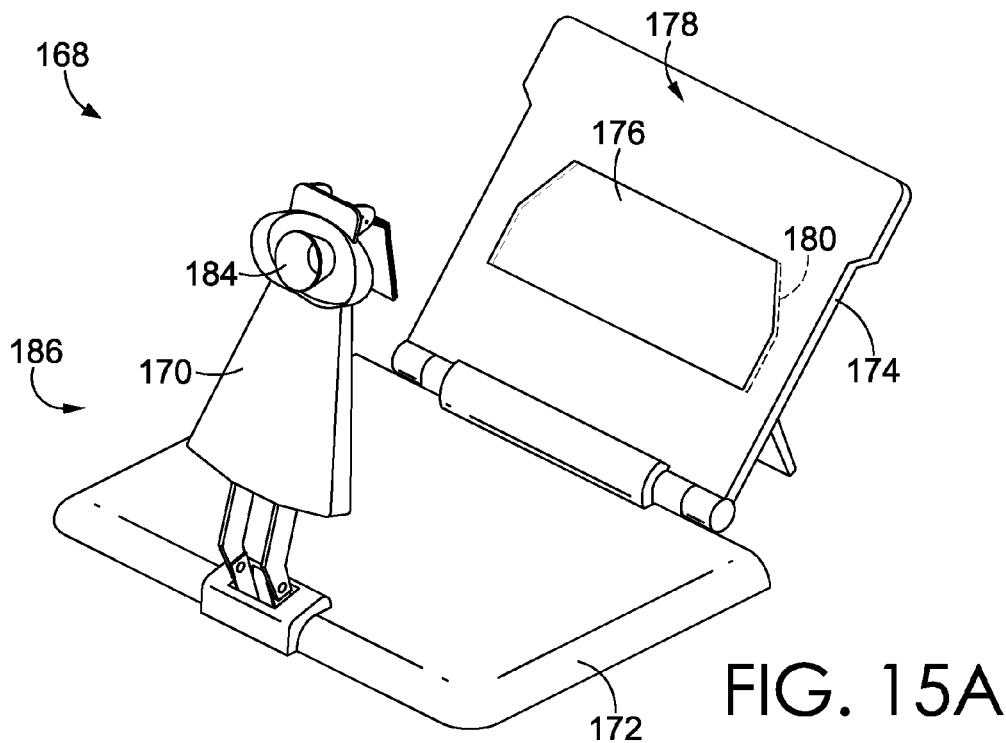
FIG. 15A is a front, perspective view of a drawing apparatus in an expanded position with a support platform in a collapsed position, in accordance with an embodiment of the invention.
Figure 15B:
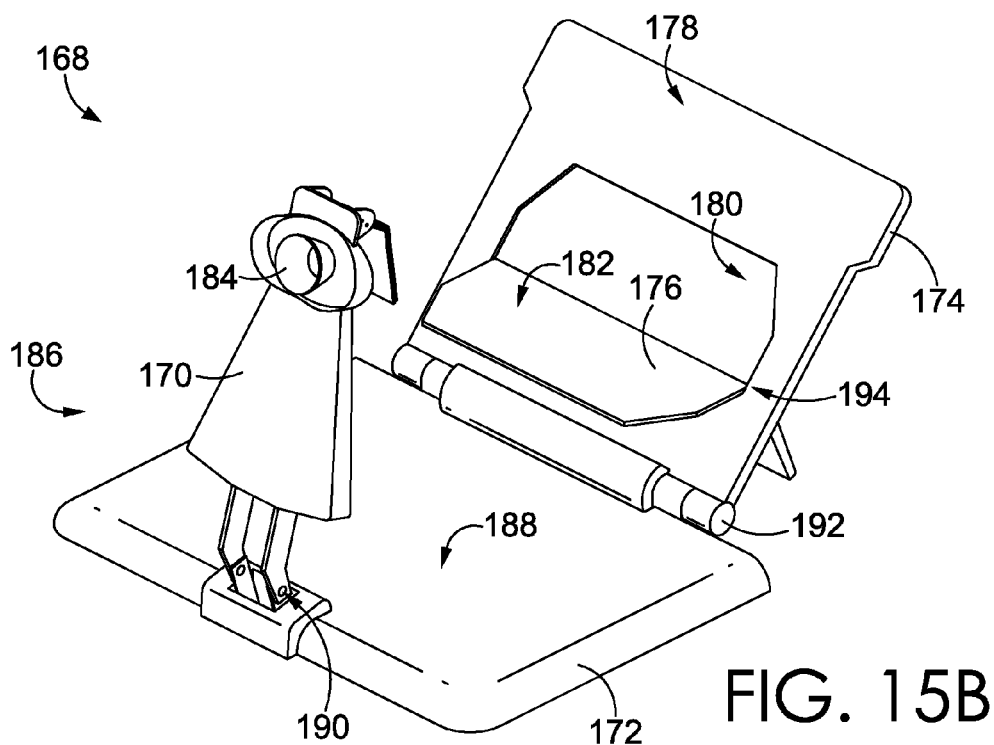
FIG. 15B is a front, perspective view of a drawing apparatus in an expanded position with a support platform in an expanded position, in accordance with an embodiment of the invention.

In one embodiment of the invention, as depicted in FIGS. 15A-15B, a drawing apparatus 168 may be configured to include a first support 170, a second support 172, and a third support 174, may further include a support tray 176 on a display and/or copy surface 178. In some embodiments, the copy surface 178 (including the bottom surface of support tray 176) is configured to support a drawing object on the copy surface 178 of third support 174. For example, a collapsed support tray 176 (i.e., FIG. 15A) may be used to position a two-dimensional drawing object (e.g., a piece of paper or a touchscreen device) on the copy surface 178 of third support 174 for viewing through the eyepiece 184 from the front side 186 of the drawing apparatus 168. In a further embodiment, the position of the support tray 176 may be opened and/or extended to the expanded position of FIG. 15B, providing a horizontal support surface 182 for displaying a three-dimensional object, such as the drawing object 48 (toy car) of FIG. 6.

In some embodiments of the invention, support tray 176 is configured to remain embedded in a top surface of the copy surface 178 when in a closed position, as shown in FIG. 15A, with the perimeter of support tray 176 mating to a cavity 180 on the surface of third support 174. According to some embodiments, based on resting the body of support tray 176 within the cavity 180 on the drawing surface 178 of third support 174, a drawing object such as a printed image from a magazine propped against third support 174 may remain flat against drawing surface 178. In a further embodiment, upon removing at least a portion of the support tray 176 from the cavity 180 (i.e., "popping" the tray out of its storage compartment), the support tray may be configured to rest in a neutral and/or horizontal position to provide another supporting location for positioning an object for reproducing in a drawing on the drawing surface 188 of the drawing apparatus 168.

In one embodiment, first support 170 may be pivoted about a first pivot point 190, into a first viewing position, such that a user may view both a drawing object supported by third support 174 (on either the drawing surface 178 or the support tray 176) and a drawing surface 188 of second support 172, as discussed with reference to the lens system in association with eyepiece 184. In further embodiments of the invention, the positioning of the first support 170 (via pivoting about pivot point 190), the positioning of the eyepiece 184, the positioning of the third support 174 (via pivoting about pivot point 192), and/or the positioning of the support tray 176 (via pivoting about pivot point 194) may provide various configurations of the drawing apparatus 168 for reproducing various different types of drawing objects onto a drawing surface, by virtue of the corresponding lens orientation and the mirrored surface on the first support 170 of the drawing apparatus 168.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A drawing apparatus comprising:
   a first support having a first surface and an eyepiece, wherein at least a portion of the first surface comprises a mirrored surface;
   a reflective component coupled to the first support, the reflective component comprising at least one reflective filter and at least one tinted filter;

a second support hingedly attached to the first support, the second support comprising at least one drawing surface; and a third support hingedly attached to the second support, the third support configured to support the at least one drawing object, wherein the at least one drawing surface and the at least one drawing object are simultaneously viewed through the eyepiece via the reflective component, wherein the at least one tinted filter is selectively positionable with respect to the reflective component, wherein when the tinted filter is in a first position relative to the reflective component, the drawing surface is in greater focus than the drawing object, wherein when the tinted filter is in a second position relative to the reflective component, the drawing object is in greater focus than the drawing surface, and wherein the tinted filter is in a second position when only the reflective filter is viewed through the eyepiece.

2. The drawing apparatus of claim 1, wherein the tinted filter is in a first position when a surface of the tinted filter is parallel to a surface of the reflective filter such that both the reflective filter and the tinted filter are viewed through the eyepiece.

3. The drawing apparatus of claim 1, wherein the drawing surface is viewed through the eyepiece based on reflection of the drawing surface by the mirrored surface and the reflective filter.

4. The drawing apparatus of claim 1, wherein the drawing object is viewed through both the eyepiece and the reflective filter.

5. The drawing apparatus of claim 4, wherein the drawing object is further viewed through the tinted filter.

6. The drawing apparatus of claim 1, wherein the drawing apparatus is configured to adjust between an open position and a collapsed position.

7. The drawing apparatus of claim 6, wherein the first support and the third support are adapted to fold towards the second support when the drawing apparatus is in a collapsed position.

8. A drawing apparatus for reproducing at least one drawing object on a drawing surface, the drawing apparatus comprising:

a first support comprising an eyepiece, a mirror on a first surface of the first support, and a reflective component, wherein the reflective component comprises a reflective filter and a tinted filter;

a second support coupled to the first support, the second support comprising at least one drawing surface; and a third support coupled to the second support, the third support configured to support the at least one drawing object, wherein the at least one drawing object and the at least one drawing surface are simultaneously viewed through the eyepiece from a second surface of the first support, wherein the tinted filter is selectively positionable between at least a first position and a second position relative to the reflective filter, and wherein the tinted filter is in the second position when only the reflective filter is viewed through the eyepiece, wherein when the tinted filter is in a second position, the drawing object is in greater focus than the drawing surface.

9. The drawing apparatus of claim 8, wherein the at least one drawing surface is viewed through the eyepiece based on reflection of the at least one drawing surface by the mirrored surface and the reflective filter.

10. The drawing apparatus of claim 8, wherein the at least one drawing object is viewed through the eyepiece and the reflective component.

11. The drawing apparatus of claim 8, wherein the tinted filter is in the first position when a surface of the tinted filter is parallel to a surface of the reflective filter such that both the reflective filter and the tinted filter are viewed through the eyepiece, wherein when the tinted filter is in a first position, the drawing surface is in greater focus than the drawing object.

12. The drawing apparatus of claim 8, wherein the drawing apparatus is adapted to collapse into a folded configuration.

13. A drawing apparatus comprising:

a first support comprising an eyepiece, a mirror, and a reflective component, wherein the reflective component comprises a reflective filter and a tinted filter, wherein the tinted filter is selectively positionable with respect to the eyepiece between at least a first position and a second position relative to the reflective filter, and wherein the tinted filter is in the second position when only the reflective filter is viewed through the eyepiece, and further wherein when the tinted filter is in a second position, the drawing object is in greater focus than the drawing surface;

a second support coupled to the first support, the second support comprising a drawing surface; and a third support coupled to the second support, the third support configured to secure the at least one drawing object, wherein the drawing surface and the at least one drawing object are simultaneously visible to a user through the eyepiece, wherein the at least one drawing object is directly viewed via the eyepiece and the reflective filter, and further wherein the drawing surface is indirectly viewed via the eyepiece and the mirror.

\* \* \* \* \*